F. M. HANCOCK.
FARM GATE.
APPLICATION FILED DEC. 27, 1913.
1,118,415. Patented Nov. 24, 1914.
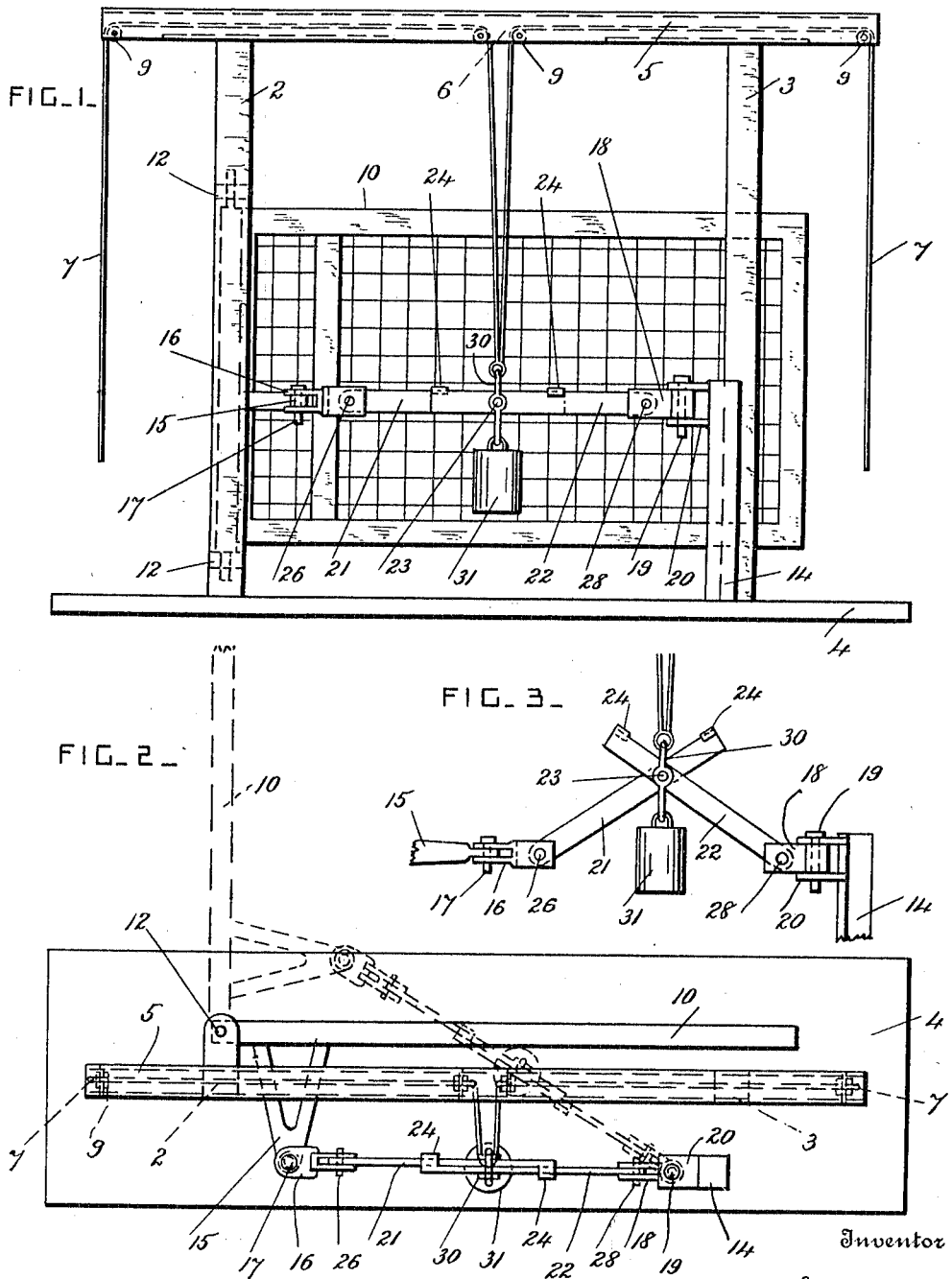

UNITED STATES PATENT OFFICE.

FERDINAND M. HANCOCK, OF DENTON, TEXAS.

FARM-GATE.

1,118,415. Specification of Letters Patent. Patented Nov. 24, 1914.

Application filed December 27, 1913. Serial No. 808,965.

*To all whom it may concern:*

Be it known that I, FERDINAND M. HANCOCK, a citizen of the United States, residing at Denton, in the county of Denton and State of Texas, have invented certain new and useful Improvements in Farm-Gates; and I do hereby declare the following to be a full, clear, and exact description of the invention, such as will enable others skilled in the art to which it appertains to make and use the same.

This invention relates to pivoted farm gates; and it consists in the novel construction and combination of the parts hereinafter fully described and hereinafter claimed whereby the gate is opened and closed from a distance by anyone approaching in either direction.

In the drawings, Figure 1 is a side view of a gate when open, provided with opening mechanism according to this invention. Fig. 2 is a plan view of the gate shown in Fig. 1, and showing also the position of the parts when the gate is closed. Fig. 3 is a front view of the opening levers when raised.

Two posts 2 and 3 are secured to a suitable base 4 or in the ground, and are arranged at one side of the road at a little distance apart. A longitudinal guide tube 5 is secured to the tops of the posts 2 and 3, and has an opening 6 at the middle part of its length and on the lower side of it. Two opening and closing cords 7 are provided, and pass upwardly through the opening 6 and longitudinally in opposite directions through the tubular guide. The opposite end portions of these cords depend from the ends of the tube and are grasped and pulled upon to open and close the gate. The cords are carried on supports 9 in the tube, and the tube may be open at its bottom side. This guide tube protects the cords from the weather. The gate panel 10 is hinged to the post 2, and when opened it turns on its hinges 12 and swings toward the other post 3. A fulcrum post 14 is secured near the post 3 and on the opposite side of it from the gate panel, for the attachment of the operating levers. An arm 15 is secured to the gate panel near its hinges and projects laterally from it. A connecting-piece 16 is pivoted to the arm 15 by a vertical pin 17; and a connecting-piece 18 is pivoted by a vertical pin 19 to a pair of lugs 20 which project from the post 14 longitudinally of the guide tube.

Two levers 21 and 22 have their adjacent end portions pivoted together by a horizontal pin 23, and their overlapping portions have stops 24 on their upper sides which normally hold the two levers in line with each other. These stops permit the levers to be moved upwardly at their pivot pin 23, and prevent them from folding downwardly. The outer end portion of the lever 21 is pivoted to the connecting-piece 16 by a horizontal pin 26; and the outer end portion of the lever 22 is pivoted to the connecting-piece 18 by a horizontal pin 28.

A clevis 30 is provided for connecting the cords 7 to the pivot 23 of the levers, and a weight 31 is suspended from this clevis. When the gate is open, as shown in full lines in Fig. 2, it is closed by pulling either of the cords with a sharp jerk and then letting it go suddenly. The pull on the cord raises the levers 21 and 22 at their pivot, as shown in Fig. 3, and turns the gate panel on its hinges until the arm 15 is in line with the levers 21 and 22, these levers also turning horizontally on the vertical pivot 19. The momentum of the gate panel carries the pivot 17 of the arm out of line with the levers 21 and 22, and the weight 31 then pulls down the two levers, the cord being let go, and thereby completes the closing of the gate. The gate is opened in a similar manner by pulling either of the cords. The pull on the cord moves the gate panel partway on its hinges; and on the cord being let go, the momentum of the gate panel carries the pivot of its arm past the center line of the levers; and the weight then pulls down the levers and completes the opening of the gate.

What I claim is:

The combination, with a gate post, and a gate panel hinged at one end thereto; of a post arranged near the free end of the gate panel when open, a guide tube carried by the two posts and extending substantially parallel to and longitudinally beyond each end of the open gate panel, a fulcrum post arranged adjacent to the last said post, an arm projecting laterally from the gate panel near its hinges, jointed lever mechanism arranged substantially parallel to the guide tube and the gate panel when the gate is open, said lever mechanism being pivoted to the fulcrum post and the said arm, and operating cords carried by the guide tube and connected at one end to the lever mechanism and arranged with their free end portions depending from the ends of the guide tube.

In testimony whereof I have affixed my signature in the presence of two witnesses.

FERDINAND M. HANCOCK.

Witnesses:
B. H. DEAVENPORT,
L. T. MILLICAN.

Copies of this patent may be obtained for five cents each, by addressing the "Commissioner of Patents, Washington, D. C."